UNITED STATES PATENT OFFICE.

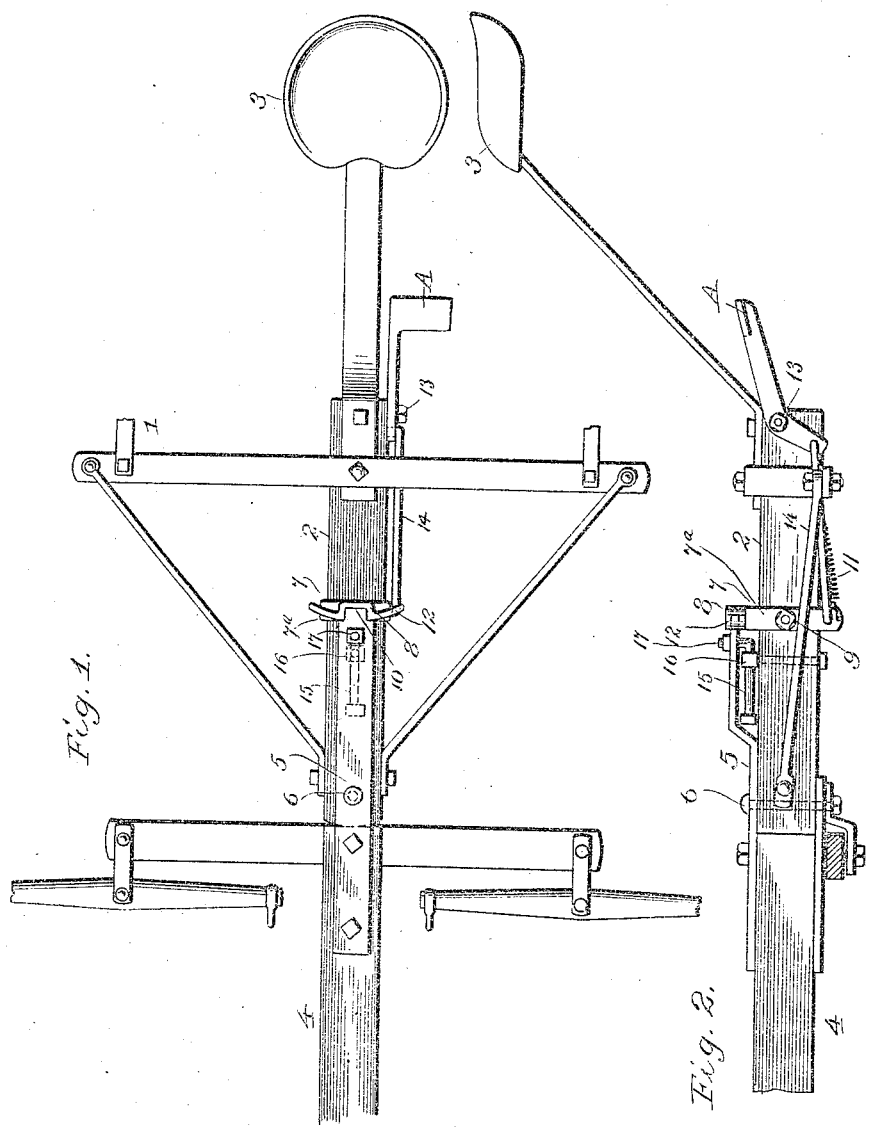

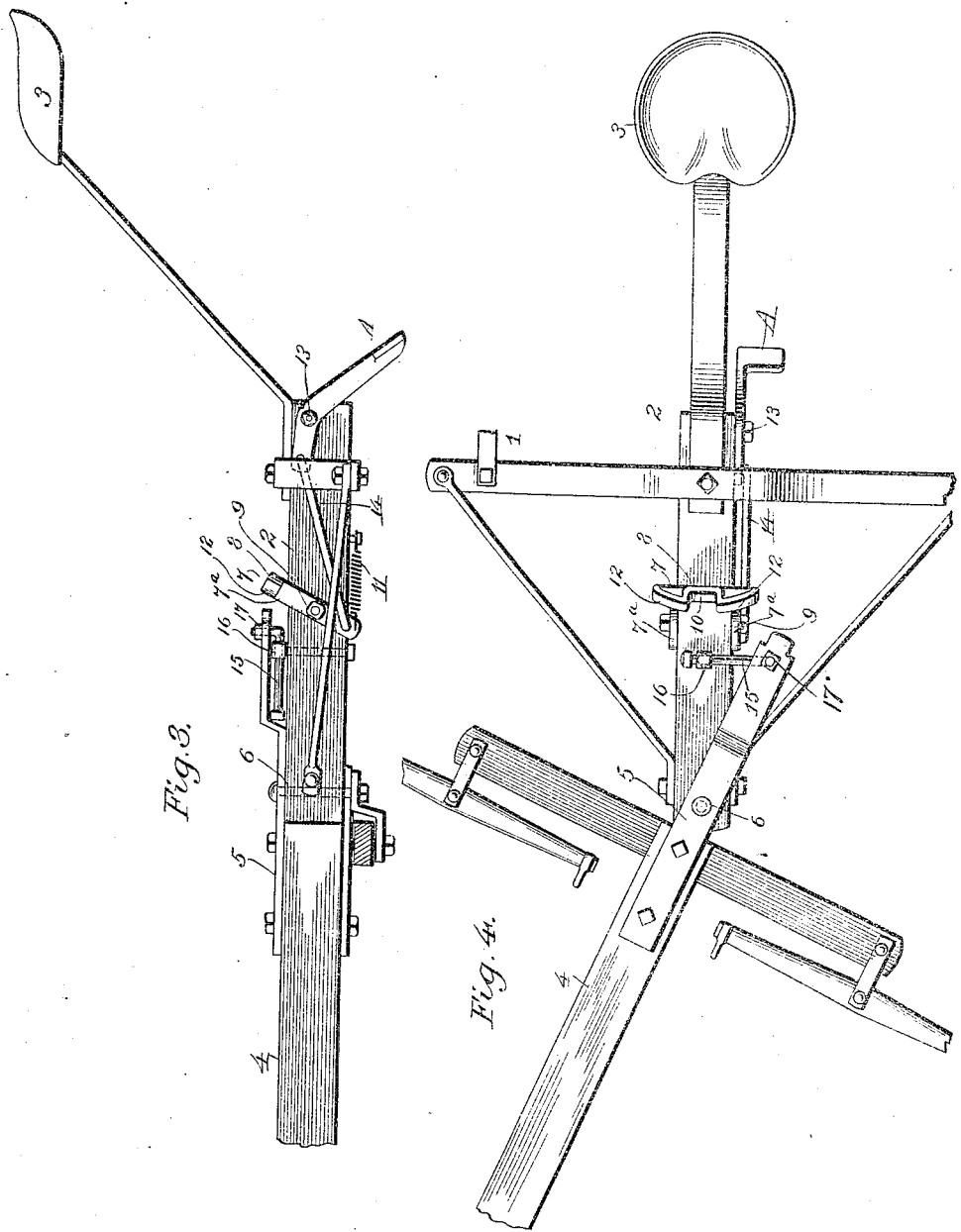

HARRY S. DICKINSON, OF MOLINE, ILLINOIS, ASSIGNOR TO MOLINE PLOW COMPANY, A CORPORATION OF ILLINOIS.

DRAFT-POLE CONNECTION FOR AGRICULTURAL IMPLEMENTS.

1,205,334. Specification of Letters Patent. Patented Nov. 21, 1916.

Application filed June 26, 1914. Serial No. 847,373.

*To all whom it may concern:*

Be it known that I, HARRY S. DICKINSON, a citizen of the United States, residing at Moline, in the county of Rock Island and State of Illinois, have invented certain new and useful Improvements in Draft-Pole Connections for Agricultural Implements, of which the following is a specification, reference being had therein to the accompanying drawing.

This invention relates to agricultural machines, and has reference more particularly to the means for connecting the draft pole thereto, the object of the invention being to enable the pole, when the conditions encountered in practice require, to swing laterally freely relatively to the frame of the machine, in order for instance, to facilitate the turning of the machine.

The invention is applicable to various forms of agricultural machines, but is of particular advantage in connection with disk harrows; and the invention consists in mounting the pole on the frame of the machine in such manner, that the pole may swing laterally with relation to the same, and in combining therewith, controllable means for holding the pole at will against lateral movement and in fixed relation to the frame. As a result, the pole may be held in a longitudinal position fixedly with relation to the frame, and when occasion arises, the holding means may be actuated at the will of the driver, and the pole released and permitted to swing freely.

The invention consists also in the details of construction and combination of parts hereinafter described and claimed.

In the accompanying drawings: Figure 1 is a top plan view of the forward portion of a harrow frame having my invention applied thereto, the pole being shown extending longitudinally therefrom and held fixedly with relation to the same. Fig. 2 is a side elevation of the same. Fig. 3 is a side elevation, showing the locking means operated to release the pole. Fig. 4 is a top plan view showing the released pole swung around to inclined position.

Referring to the drawings: 1 represents a portion of the frame of the machine, which frame is provided with a forwardly extending fixed frame-member 2 constituting in effect a stub pole, which gives support to a driver's seat 3.

4 represents a draft pole which is pivoted to the forward end of the stub pole, by means of a plate 5 fixed to the rear end of the pole and extending rearwardly therefrom and forming a rear extension of the pole, a vertical pivot bolt 6 being extended through the plate and stub pole and constituting a vertical pivotal axis, on which the pole is adapted to swing freely, laterally with relation to the frame.

7 represents a locking device for holding the pole fixedly in relation to the frame. This locking device is in the form of a fore and aft movable latch having parallel vertical arms 7ª and a horizontal portion 8 connecting the upper ends of the arms. The portion 8 of the latch extends across the upper side of the stub pole, and the parallel arms extend downwardly on opposite sides of the same to which they are pivoted by means of a horizontal pivot bolt 9, the result being that the latch may be swung forwardly as shown in Fig. 2 to a position to lock the pole fixedly to the frame, and may be swung rearwardly to releasing position, as shown in Fig. 3. The upper portion 8 of the latch is provided with a central socket 10, which, when the pole is in a longitudinal position as shown in Fig. 1, and the latch is in a forward locking position, receives the rear end of the extension 5 of the pole, and will lock the pole fixedly to the frame. The latch is acted on by a spring 11 sustained by the stub pole and tending normally to hold the latch yieldingly in its forward locking position. On opposite sides of the socket, the latch is formed with sloping surfaces 12, 12, adapted to be engaged by the extension on the pole when the latter swings around from an inclined to a longitudinal position, such engagement pushing the latch rearwardly against the pressure of the spring and permitting the end of the extension to automatically seat in the socket.

The latch is adapted to be controlled by the driver occupying the seat 3, and for this purpose an angular foot lever A is pivoted between its ends as at 13 to the side of the stub pole at the rear extremity thereof, which lever is operatively connected with the swinging latch by means of a connecting link 14 pivoted at its rear end to the forward end of the foot lever, and pivoted at its forward end to the lower end of one of the arms 7ª of the latch. The form and relation of these parts is such that when the foot lever is depressed from the position shown in Fig. 2, to that shown in Fig. 3, the upper active portion of the latch will be swung rearwardly, and the continued depression of the lever will cause the point of pivotal connection of the link 14 with the foot lever, to "pass center"; whereby the latch will be locked in its rear releasing position. The latch is released from this position, and permitted to be swung forward by its spring 11, by pressing lightly with the toe of the foot upwardly against the under side of the lever.

In order that when the pole is released from its locked longitudinal position, it may be limited in its lateral swinging motions, I provide a link 15, which is mounted to slide in a guiding member or head 16 swiveled to the stub pole, which link has its end pivoted as at 17 to the rear extension 5 of the pole. In the lateral swinging movements of the pole, this link will slide back and forth through the swiveling head 16, and by reason of the swiveling movements of the head, the link may swing around to the right or left according to the direction of the swinging movements of the pole, and will in this manner limit said swinging movements in both directions.

In the operation of the device under normal conditions of use, the pole will be held locked fixedly to the frame and extending straight forward therefrom longitudinally as shown in Fig. 1, the foot lever being in its upper position, and the locking latch in its forward locking position, holding the pole fixedly against lateral movement. In the event of its being desired to permit the pole to swing to the right or left relatively to the frame, for instance when the machine is to be turned by the team, the driver presses down with his foot on the foot lever, thereby swinging the locking latch rearwardly and releasing the pole, whereupon the latter will be free to swing to the right or left, subject to the limiting action of the link 15. If the conditions are such that the pole is to be left free to swing laterally for a considerable time, the driver pushes down with sufficient pressure on the foot lever, to cause the jointed connection of the link 14 therewith, to "pass center", whereby the latch will be locked in releasing position. If however the conditions are such that the pole is to be allowed to swing for a short time only, the driver will, after depressing the lever far enough to release the pole, raise his foot therefrom, whereupon the latch will swing forward under the influence of its spring to its locking position. When now the pole is swung back from an inclined to a longitudinal position, the extension thereon will engage the sloping surface at the side of the notch in the latch, and the latter will be automatically swung rearward far enough to permit the end of the extension to be seated and locked in the socket 10.

I have illustrated and described my improved device in the particular details which I prefer to adopt and which in practice have been found to answer to a satisfactory degree the objects to be attained, but it will be manifest that these details may be variously modified within the skill of the mechanic without departing from the limits of my invention; and further it will be understood that the invention is not limited to any particular form or construction of the parts, except in so far as such limitations are specified in the claims.

Having thus described my invention, what I claim is:

1. In combination with a frame, a draft pole pivoted thereto to swing laterally relatively to the frame, a link pivoted at one end to the free end of the pole, a guiding member on the frame in which the link is adapted to slide in the swinging movements of the pole, said link and guiding member coöperating with each other in limiting the swinging movement of the pole in both directions, and releasable means for holding the pole against swinging movement.

2. In combination with a frame, a draft pole pivoted thereto to swing laterally relatively to the frame, a swiveling head on the frame, a link pivoted to the pole and sliding through the head, a stop on the end of the link, and releasable means for holding the pole against swinging movement.

3. In combination with a frame provided with a stub pole, a draft pole pivoted to the stub pole to swing laterally and provided with a rearward extension adapted to overlie the stub pole when the draft pole is in a medial position, a releasable locking latch sustained by the stub pole and acting on the said extension to normally hold the pole against swinging movement, said latch being operable to release the pole at will to permit it to swing, and a connecting member between the stub pole and said extension, said connecting member being jointed at one end to the extension and having a jointed connection with the stub pole, and said member being shiftable by the movements of the pole alternately to opposite sides of the stub pole and operating in its shifting movements to limit the movements of the pole in both directions.

4. In combination with a frame, a stub pole thereon, a draft pole pivoted to the forward end of the stub pole to swing laterally relatively to the same, a rearward extention on the pole overlying the stub pole, a locking latch comprising two vertical arms and a horizontal connecting portion, the said arms extending on opposite sides of the stub pole and pivoted thereto on a horizontal transverse axis, and the connecting portion extending across the stub pole and being provided with a recess to receive the extension on the pole, and being provided also with sloping surfaces on opposite sides of the recess adapted to be engaged by the extension when the pole swings toward central position, and a spring acting to urge the latch in the path of said extension.

5. In combination with a frame, a draft pole sustained thereby and movable laterally relatively thereto, a locking latch pivoted on the frame and adapted to lock the pole against lateral movement, an operating lever mounted on the frame, and a connecting device pivoted to the latch and lever, the relation of said parts being such that when the lever is operated to release the latch, the point of pivotal connection of the connecting device with the lever will "pass center" and the latch will be held in releasing position.

6. In combination with a frame provided with a stub pole, a draft pole pivoted to the stub pole to swing laterally and provided with a rearward extension adapted to overlie the stub pole when the draft pole is in a medial position, an upright locking latch pivoted between its ends to the stub pole on a horizontal transverse axis, said latch being provided with an upper horizontal portion extending across the stub pole and formed to be interlocked with said extension on the swinging pole to hold the latter in a medial operative position, a foot lever pivoted between its ends to the stub pole on a horizontal transverse axis and having its rear end in position to be operated by the driver's foot, and a link jointed at its rear end to the forward end of the foot lever and jointed at its forward end to the lower end of the latch.

In testimony whereof, I have affixed my signature in presence of two witnesses.

HARRY S. DICKINSON.

Witnesses:
T. C. BLANDING,
J. J. LAMB.